Dec. 7, 1937.  J. G. F. AUGUSTIN  2,101,232
FILLING MACHINE
Filed Dec. 23, 1935  3 Sheets-Sheet 1
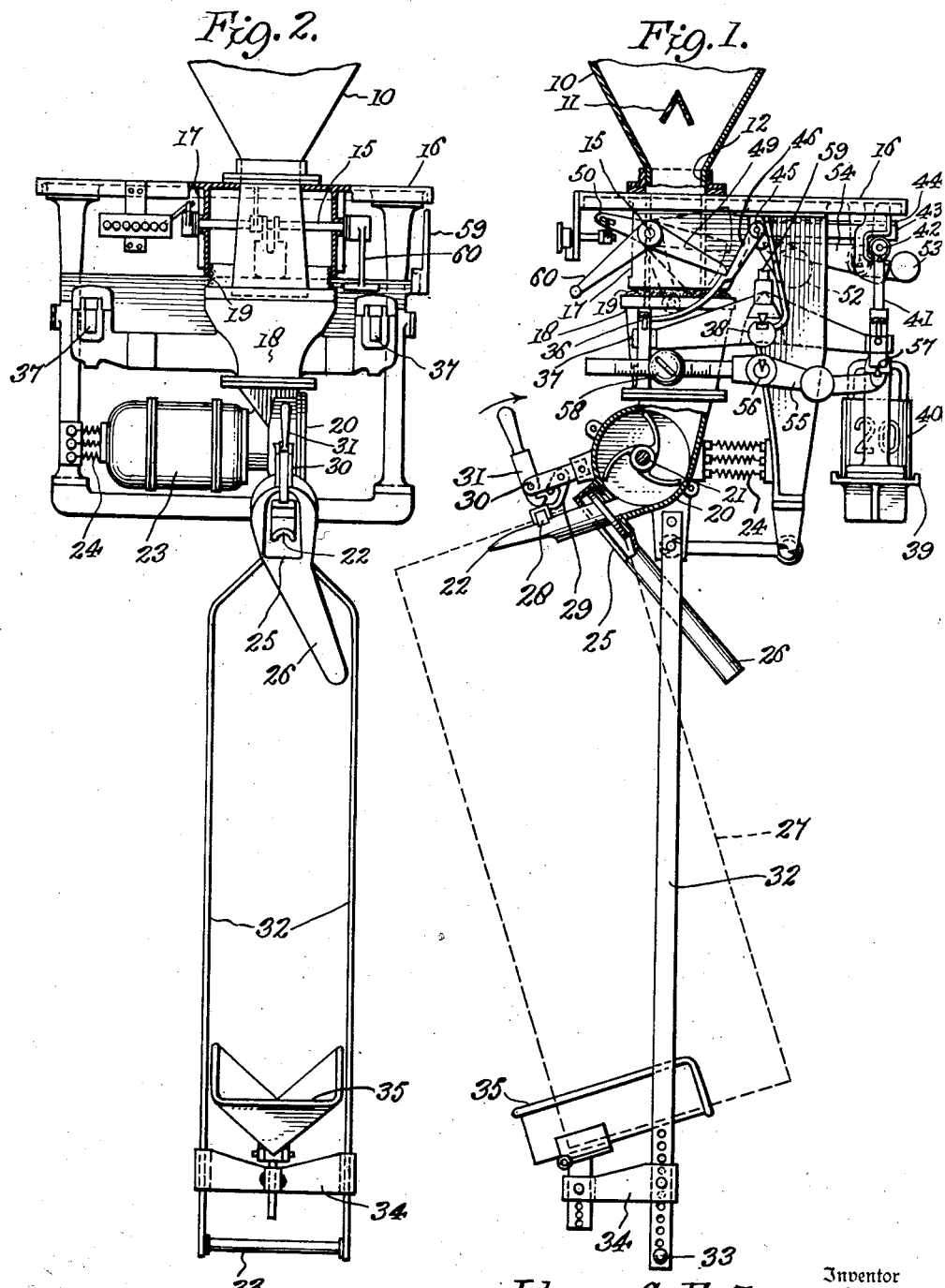
Inventor
Johann G. F. Augustin
By
C. P. Goepel
Attorney Dec. 7, 1937. J. G. F. AUGUSTIN 2,101,232
FILLING MACHINE
Filed Dec. 23, 1935 3 Sheets-Sheet 2
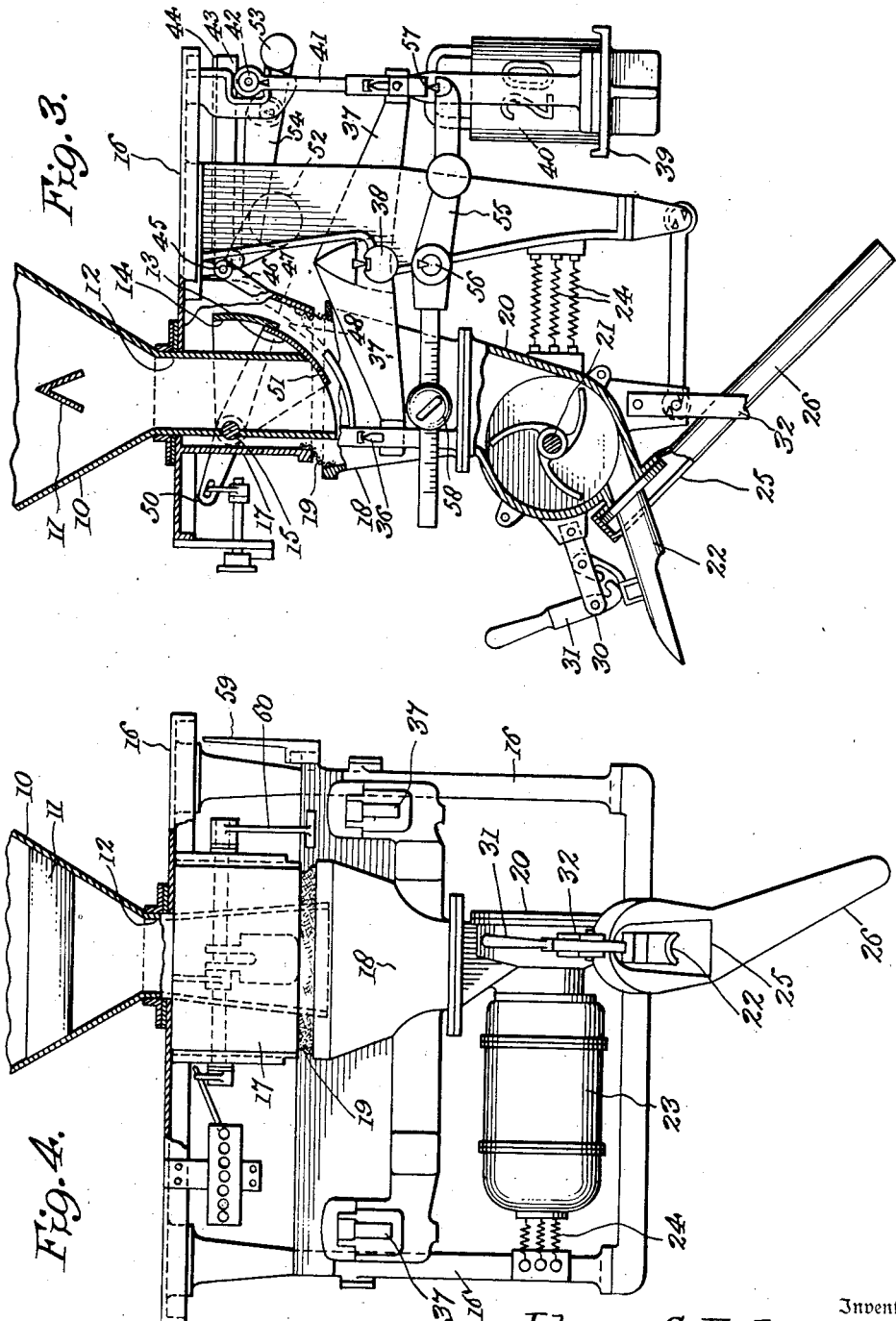
Inventor
Johann G. F. Augustin
By C. P. Goepel
Attorney

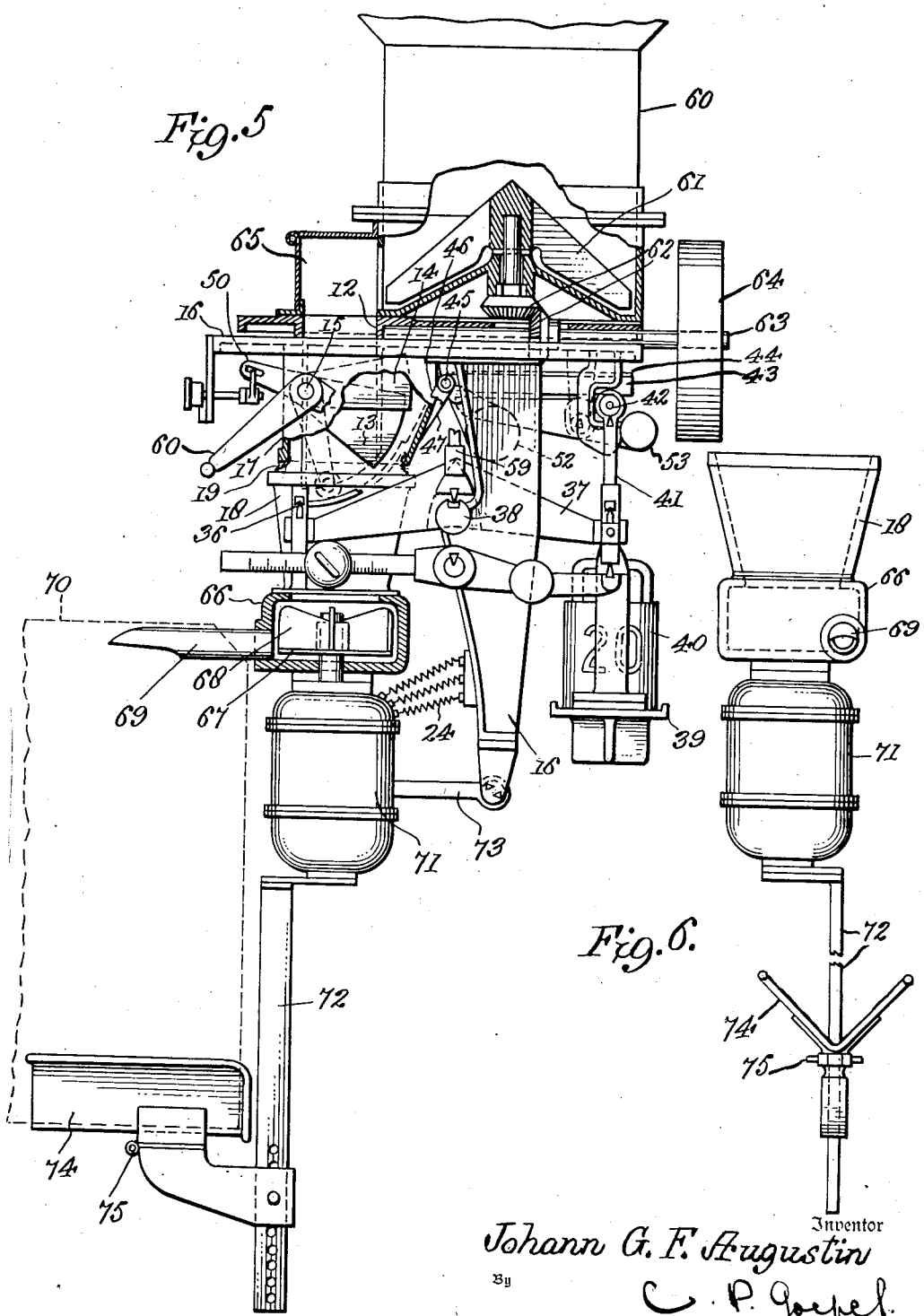

Patented Dec. 7, 1937

2,101,232

UNITED STATES PATENT OFFICE 2,101,232

FILLING MACHINE

Johann Georg Ferdinand Augustin, Krefeld, Germany, assignor to Verpackungsbedarf G. m. b. H., Krefeld, Germany Application December 23, 1935, Serial No. 55,912
In Germany January 13, 1934

4 Claims. (Cl. 249—61)

The present invention relates to filling machines, and more particularly to that type of machine wherein quantities of material are weighed and are subsequently delivered into bags or the like.

An object of the present invention is to provide certain improvements in filling machines of this character wherein the devices for delivering the material into bags or the like, and for supporting the latter, are mounted on a weighing apparatus and wherein all of the connecting parts between the filling and weighing apparatus and devices and the stationary portion are flexible so as not to interfere with the balancing of the weighing apparatus.

An object of the present invention is to provide improved means for gradually cutting-off or tapering the flow of the material from the supply hopper to the weighing hopper as the weight of the supplied material approaches a predetermined amount, and for automatically operating the various mechanisms for insuring correct amounts of the material to be fed to each bag or to the receptacle.

A further object of the invention is to provide an improved counter-balancing means for obtaining a fine adjustment of the weighing mechanism, and to further provide improved means for effecting a positive or force feed of the material through the weighing mechanism to the receptacle to be filled.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevation, partly in section of a filling machine, having a bag mounted thereon and in position of feeding material to the weighing hopper.

Figure 2 is a front elevation of the same.

Figure 3 is a fragmentary enlarged sectional view taken through the upper portion of Figure 1.

Figure 4 is a side elevation of the same.

Figure 5 is a front elevation partly in section of a slightly modified form of filling machine, and Figure 6 is a detail elevation of the material force feeding machine of Figure 5, the view being taken axially at right angles to the lower portion of Figure 5.

Referring now to the drawings, and first to construction shown in Figures 1 to 4, 10 designates a supply hopper in which pulverized or granulated material is adapted to be placed and which is to be filled into bags or other receptacles. The hopper 10 may have a spreader 11 therein, and at its lower end is provided with a reduced neck 12 which extends downwardly and is adapted to be closed at times by a pair of segmental valves or gates 13 and 14. These gates are provided at opposite sides with pivot arms mounted on a shaft 15 which may be carried at one side of the neck 12 and the valves 13 and 14 are concentrically mounted so that the valve 14 may swing in overlapping relation over the valve 13.

The neck 12 extends down through a suitably constructed frame 16 and the latter carries a casing or housing 17 which encloses the neck 12 and its valves 13 and 14. Beneath the neck 12 is disposed a weighing and delivering mechanism, the same having a weighing hopper 18 opening upwardly beneath the neck 12 and substantially sealed to the lower end of the housing 17 by a flexible ring or cover 19 which admits the free rise and fall of the hopper 18 independently of the neck 12 and housing 17. The hopper 18 is of sufficient size, as is also the housing 17 to admit the swinging of the valves 13 and 14 into and out of position across the lower end of the neck 12.

The hopper 18 is secured at its lower end to an impeller casing 20 which communicates with the hopper and is provided interiorly with a rotary impeller 21 for forcing material downwardly from the hopper 18 through the casing 20 and out through a delivery nozzle 22. The impeller 21 is connected directly to an electric motor 23 which has its housing secured to the impeller casing 20 and is supported as a unit therewith, the motor 23 having current supply wires 24 suitably coiled or otherwise flexibly disposed between the motor 23 and the fixed frame 16. The delivery spout or nozzle 22 is provided at its inner end with a receptacle corner receiving hood 25 suitably recessed at its forward side to receive a corner of a bag, as shown in Figure 1, and which is provided with a combined air and dust receiving conduit 26 which may lead to any suitable point of discharge and which extends downwardly from the hood 25. The receptacle may be applied to the nozzle 22, and supported therebeneath in any suitable manner. For instance, the receptacle, shown at 27 in dotted lines, may be of the type having a nozzle aperture at one corner so that the receptacle may receive the nozzle in its aperture and bear across the upper side of the nozzle with the open corner of the bag or other receptacle projecting into the hood 25. The up per end of the bag is held to the nozzle by means of a presser block 28 mounted on the lower end of a hinged arm 29 which is carried upon a projection 30 of the impeller casing 20. A hand lever 31 is pivoted near its lower end on the projection 30 opposite the block 28 and the arm 29 and the lower end of the lever 31 are provided with inter-locking hooks adapted for inter-engagement when the upper end of the lever 31 is swung downwardly and outwardly from the apparatus. The hooks thus connect the lever 31 to the arm 29 and the latter is raised by the action of the lever to release the block 28 from the bag. The lower end of the lever 31 is of sufficient length to bear against the block 28 when the lever 31 is raised to clamp the bag on the nozzle.

Extending downwardly from the impeller casing 20 is a bracket 32 which may comprise a pair of spaced apart parallel straps secured by a crossbar 33 at the lower ends and which support a horizontally extended bracket arm 34 adapted for adjustment by a pin and aperture connection to the desired height upon a bracket for accommodating receptacles or bags 27 of different dimensions. The bracket arm 34 pivotally carries a seat or rest 35 which is normally inclined to receive the lower outer corner of the bag or receptacle, as shown in Figure 1, and which is adapted to tilt with the receptacle during its movement on the bracket support.

The hopper 18, at the upper end of the weighing device, is connected by the usual knife edge connections 36 to the outer end of a scale beam 37, and the scale beam may comprise a pair of parallel members as shown in Figures 3 and 4 particularly. The scale beam 37 is mounted upon a fulcrum support 38 carried by the frame 16 and engaging the intermediate portion of the scale beam 37, and the inner or opposite end of the scale beam is pivoted to a weight pan 39 upon which is disposed a weight 40.

The upper end of the rod 41 terminates in a bearing 42 disposed a slight distance beneath the lower end portions of levers 43 and 44, so that when the weight rises by the tilting of the scale beam 37 first the lever 43 is raised and later the lever 44 is raised.

The levers 43 and 44 are mounted on the pivot 45 of the frame 16 and are provided with downwardly and forwardly curved arms 46 and 47 which have shoulders 48 thereon facing the respective arcuate valves 13 and 14 and which engage the free ends of arms 49 and 50 carried by the valves 13 and 14 respectively. The shoulders 48 hold the arms 49 and 50 and their valves 13 and 14 in open position and the shoulders are released from the arms by the raising of the levers 43 and 44. The inner valve 13 is provided at its lower or forward edge with an aperture 51 of sufficient size to admit of the final feeding of the material down into the weighing hopper 18 after the bulk of the material is in the hopper and the load has been practically measured. A second valve or gate 14 is adapted to be released finally to swing down and close the opening 51.

The arms 46 and 47 may be counterbalanced by a weight 52 pivoted on the frame at 45 and which is adapted to hold the valves open but which may be relieved by the counterweight 53 mounted on the inner end of a lever 54 mounted on the frame adjacent the rod 41 of the weight pan.

In order to obtain accuracy and fineness in weighing the material, a second scale beam 55 is mounted on the frame at 56 and has one end bearing at 57 upon the scale pan 39, while its other end carries a graduated scale and an adjustable weight 58 operable with respect to the scale for obtaining the desired counterbalance.

The filling machine is adapted for use with various kinds of materials capable of being filled into receptacles or bags and is particularly adapted for handling material which in bulk is sensitive to slight variations in weight, such as grain, coffee beans, and the like, and materials which may be easily broken in handling as the mechanism of this invention is particularly adapted to preserve the original shape and condition of the material without rough handling or undue jarring thereof.

The material passes from the hopper 10 down through the neck 12 into the weight hopper 18, and is fed downwardly from the latter through the casing 20 by the impeller 21. The impeller 21 moves the material at a desired rate of flow through the weighing apparatus and through the nozzle 22 into the bag or other receptacle. As the material is fed down through the hopper 18 and receptacle 27 the weight of the material is increased on the outer end of the scale beam 37 and, as the scale beam is counterbalanced, the rod 41 is raised so that as the full load is approached the first lever 43 is lifted sufficiently to release its locking shoulder 48 and free the inner valve 13. The remainder of the load is obtained by flow of the material through aperture 51 until the final load is obtained when the second lever 44 is raised and the second valve 14 is tripped so that it falls into closed position to shut off the flow through the aperture 51.

The valves 13 and 14 are provided with levers 59 and 60 which are connected by suitable shafts or rods to the valves 13 and 14 for swinging the latter into their open positions when starting the operation of the filling mechanism.

In the modification shown in Figures 5 and 6, the hopper 61 may be relatively had for handling a large quantity of material, and in this case the hopper is provided in its bottom with a rotary impeller or feeder 61 of the centrifugal type, which is connected by bevel gears 62 to a drive shaft 63 adapted to be driven by a belt or the like through a pulley 64. The material from the impeller 61 is fed through one side of the bottom of the hopper 60 into a channel 65 from which the neck 12 extends, and which is fully disclosed in connection with the preferred form.

The remaining portions of the apparatus are as brought out in the preferred structure above described with the exception that the impeller casing 66 connected to the bottom of the hopper 18 is provided with an impeller having a bottom disc 67 and radial fins 68 for radially projecting the material through the horizontal spout 69 which enters a corner of the bag 70 or other receptacle desired. The motor 71 of the impeller may be disposed immediately beneath the casing 66 and connected to the impeller and may also provide a connection for a supporting bracket 72 upon which the bag 70 may rest.

In both forms of the invention the vertical hanging weighing devices, including the hopper 18 and the impeller are maintained in substantially vertical position at all times by one or more links 73 which are pivoted at one end to the lower end of the frame 16 and at its other end to the motor 71, in the modified form, and to the bottom portion of the casing 20 in the preferred form.

The bracket 72 is provided with a bag holder 7

74 adjustably mounted, as shown in Figures 5 and 6, and which may have a pair of upwardly diverging wings between which the bottom of the receptacle or bag is seated. This holder 74 is mounted on a hinge 75 carried by the bracket 72 so that the holder 74 may tilt or swing outwardly with the bag 70 as it is withdrawn from the machine.

It is obvious that various changes and modifications may be made in the details of construction and design of the above specifically described embodiment of this invention without departing from the spirit thereof, such changes and modifications being restricted only by the scope of the following claims.

What is claimed is:

1. In a machine for filling bags and similar receptacles, a supporting frame, a storage bin secured to said frame and having a discharge mouth, a balance bearing arranged at said frame, a scale beam resting in said balance bearing, a feeding hopper suspended from one end of said scale beam, rotary impelling means having an electric motor arranged at said feeding hopper, flexible means for connecting said feeding hopper and said electric motor to said frame, means for supporting the filling receptacle, said means including a tube tapering from said feeding hopper, clamping means supported above said tube for clamping the receptacle onto said tube, pins secured to said feeding hopper and secured to said frame, and links engaging said pins for forming parallel guides adapted to prevent the feeding hopper from swinging.

2. In a filling machine for bags and the like, having a frame, a feeding hopper with an open bottom for the discharge of material therefrom, valve mechanism for said open bottom, and means for supporting said feeding hopper to the frame, the combination of a weighing hopper having top and bottom openings for receiving and discharging material, and guide means supported by the weighing hopper for guiding material discharged by the weighing hopper to the bag to be filled, with a balanced bearing supported by the frame, a scale beam supported on said balanced bearing, knife edge connections on the weighing hopper engaging one end of said scale beam, a weight on the other end of the scale beam, said weight counterbalancing the weight of the weighing hopper, guide means, and the amount of desired material in the weighing hopper, and means operated by the weight end of the scale beam for closing the discharge opening of said feeding hopper by said valve mechanism, whereby an excess of the desired contents in the weighing hopper causes interruption of further supply of material to the weighing hopper.

3. In a filling machine for bags and the like having a frame, a feeding hopper with an open bottom for the discharge of material, valve mechanism for said open bottom, and means for supporting said feeding hopper and valve mechanism to the frame, the combination of a weighing hopper having top and bottom openings for receiving and discharging material, guide means supported by the weighing hopper for guiding material discharged by the weighing hopper to the bag to be filled, with a balanced bearing supported by the frame, a scale beam supported on said balanced bearing, knife-edge connections on the weighing hopper engaging one end of said scale beam, a weight on the other end of the scale beam, said weight counterbalancing the weight of the weighing hopper, guide means, and amount of desired contents in the weighing hopper, means operated by the weight-end of the scale beam for closing the discharge opening of said feeding hopper, an impeller in said guide means adapted to move the weighed charge into the bag, and a motor for operating said impeller, said impeller and motor being supported by said weighing hopper and being unsupported by the frame save by said scale beam connection, whereby an excess of the desired contents in the weighing hopper causes interruption of further supply of material to the weighing hopper, and whereby the weighed contents of the weighing hopper without further excess material is impelled by the impeller into the bag.

4. In a filling machine for bags and the like having a frame, a feeding hopper with an open bottom for the discharge of material, valve mechanism for said open bottom including a valve for closing the discharge opening provided with an opening therein, a second valve acting on the opening of the first valve to permit only small amounts to pass when said opening is uncovered, means for supporting said feeding hopper and valve mechanism on the frame, the combination of a weighing hopper having top and bottom openings for receiving and discharging material, and guide means supported by the weighing hopper for guiding material discharged by the weighing hopper to the bag to be filled, with a balanced bearing supported by the frame, a scale beam supported on said balanced bearing, knife edge connections on the weighing hopper and engaging one end of said scale beam, a weight on the other end of the scale beam, said weight counterbalancing the weight of the weighing hopper, guide means, and amount of desired contents in the weighing hopper, means operated by the weight-end of the scale beam for closing the discharge opening of said feeding hopper, first by the first valve but permitting passage of small quantities through the opening of the first valve and then closing said opening by the second valve, a weight support provided with a weight thereon, knife edge connections on said weight support connecting with said scale beam, a second balanced bearing on said frame, a second scale beam on said balanced bearing, one end of said second scale beam being connected with the weight support of the first scale beam, and a weight on the other end of the second scale beam by which additional adjustment of the first scale beam is provided, and whereby as the result of the successive operation of the valves and the knife-edge connections an accurate weighing of the desired contents to be discharged, is obtained.

JOHANN GEORG FERDINAND AUGUSTIN.